United States Patent
Pal (10) Patent No.: US 12,275,534 B2
(45) Date of Patent: Apr. 15, 2025

(54) MOTOR COOLING SYSTEM (71) Applicant: Hamilton Sundstrand Corporation, Charlotte, NC (US)

(72) Inventor: Debabrata Pal, Hoffman Estates, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 191 days.

(21) Appl. No.: 17/406,616

(22) Filed: Aug. 19, 2021

(65) Prior Publication Data
US 2023/0055244 A1 Feb. 23, 2023

(51) Int. Cl.
*B64D 33/08* (2006.01)
*B64D 27/24* (2024.01)
B64D 27/02 (2006.01)
B64D 27/10 (2006.01)

(52) U.S. Cl.
CPC .............. *B64D 33/08* (2013.01); *B64D 27/24* (2013.01); *B64D 27/026* (2024.01); *B64D 27/10* (2013.01)

(58) Field of Classification Search
CPC ........ B64D 33/08; B64D 27/24; B64U 10/13; B64U 20/98; B64U 30/29; B64U 50/19; B64U 50/23; B64U 20/94
See application file for complete search history.

(56) References Cited

U.S. PATENT DOCUMENTS

| | | |
|---|---|---|
| 5,729,969 A | 3/1998 | Porte |
| 10,294,822 B2 | 5/2019 | Caruel et al. |
| 2020/0039654 A1 | 2/2020 | Smith et al. |

FOREIGN PATENT DOCUMENTS

| | | | | |
|---|---|---|---|---|
| CN | 107458604 A | | 12/2017 | |
| CN | 207111223 U | * | 3/2018 | |
| FR | 3105173 A1 | * | 6/2021 | ........... B64C 39/022 |
| JP | 2020131781 A | | 8/2020 | |
| WO | 2016192022 A1 | | 12/2016 | |
| WO | WO-2020043300 A1 | * | 3/2020 | |

OTHER PUBLICATIONS

CN-207111223-U Translation (Year: 2018).*
WO 2020/043300 A1 Translation (Year: 2020).*
Translation of FR3105173A1 (Year: 2021).*
European Search Report for European Application No. 22188799.5; Report Mail Date Jan. 19, 2023 (7 Pages).

* cited by examiner

*Primary Examiner* — Richard Green
*Assistant Examiner* — Steven J Shur
(74) *Attorney, Agent, or Firm* — CANTOR COLBURN LLP (57) ABSTRACT

A vehicle includes a body, at least one propulsion system including an electric component, a strut extending between the body and the at least one propulsion system, and a cooling system operably coupled to the electric component of the at least one propulsion system. A portion of the cooling system is arranged within the strut.

17 Claims, 6 Drawing Sheets

MOTOR COOLING SYSTEM

BACKGROUND

Exemplary embodiments of the disclosure relate to a vehicle having an propulsion system, and more particularly, to a cooling system for cooling one or more electric components of the propulsion system.

In existing vehicles, oil is commonly used to cool electronic components, such as a motor and generator. A cooler is typically arranged within the fluid loop to remove heat from the oil. However, coolers requires a significant amount of space onboard the vehicle, as well as an a system for moving air through the cooler.

SUMMARY

According to an embodiment, a vehicle includes a body, at least one propulsion system including an electric component, a strut extending between the body and the at least one propulsion system, and a cooling system operably coupled to the electric component of the at least one propulsion system. A portion of the cooling system is arranged within the strut.

In addition to one or more of the features described above, or as an alternative to any of the foregoing embodiments the cooling system includes a cooling fluid and heat is removed from the cooling fluid within the portion of the cooling system by a secondary fluid.

In addition to one or more of the features described above, or as an alternative to any of the foregoing embodiments the secondary fluid is provided from a source external to the vehicle.

In addition to one or more of the features described above, or as an alternative to any of the foregoing embodiments the secondary fluid is air driven by the propulsion system.

In addition to one or more of the features described above, or as an alternative to any of the foregoing embodiments the secondary fluid is an airflow generated by movement of the vehicle.

In addition to one or more of the features described above, or as an alternative to any of the foregoing embodiments the secondary fluid is provided from a source located onboard the vehicle.

In addition to one or more of the features described above, or as an alternative to any of the foregoing embodiments the portion of the cooling system further comprises a heat exchanger, the heat exchanger being configured to receive the cooling fluid and the secondary fluid.

In addition to one or more of the features described above, or as an alternative to any of the foregoing embodiments the heat exchanger is a tube-fin heat exchanger having a base and a plurality of fins extending outwardly from the base.

In addition to one or more of the features described above, or as an alternative to any of the foregoing embodiments the cooling fluid is configured to move through the base and the secondary fluid is configured to pass between the plurality of fins.

In addition to one or more of the features described above, or as an alternative to any of the foregoing embodiments the portion of the cooling system further comprises a conduit, wherein the cooling fluid is configured to flow through the conduit away from the electric component.

In addition to one or more of the features described above, or as an alternative to any of the foregoing embodiments the portion of the cooling system further comprises a conduit, wherein the cooling fluid is configured to flow through the conduit to the electric component.

In addition to one or more of the features described above, or as an alternative to any of the foregoing embodiments the at least one propulsion system includes a first propulsion system and a second propulsion system, the first propulsion system being arranged at a first end of the strut and the second propulsion system being arranged at a second end of the strut.

In addition to one or more of the features described above, or as an alternative to any of the foregoing embodiments the at least one propulsion system is arranged at a first end of the strut and the body is arranged at a second end of the strut.

According to an embodiment, a method of cooling an electric component of a vehicle includes providing a propulsion system including the electric component, the propulsion system being mounted to the vehicle via a strut, removing heat from the electric component via a cooling fluid, and arranging the cooling fluid in a heat exchange relationship with a secondary fluid. The cooling fluid is in the heat exchange relationship with the secondary fluid when the cooling fluid is located within the strut.

In addition to one or more of the features described above, or as an alternative to any of the foregoing embodiments arranging the cooling fluid in the heat exchange relationship with the secondary fluid further comprises passing a flow of the secondary fluid about the strut.

In addition to one or more of the features described above, or as an alternative to any of the foregoing embodiments arranging the cooling fluid in the heat exchange relationship with the secondary fluid further comprises delivering a flow of the secondary fluid to an interior of the strut.

In addition to one or more of the features described above, or as an alternative to any of the foregoing embodiments arranging the cooling fluid in the heat exchange relationship with the secondary fluid further comprises providing a flow of the secondary fluid from a source located external to the vehicle.

In addition to one or more of the features described above, or as an alternative to any of the foregoing embodiments the secondary fluid is air driven by the propulsion system.

In addition to one or more of the features described above, or as an alternative to any of the foregoing embodiments the secondary fluid is an airflow generated by movement of the vehicle.

In addition to one or more of the features described above, or as an alternative to any of the foregoing embodiments arranging the cooling fluid in the heat exchange relationship with the secondary fluid further comprises providing a flow of the secondary fluid from on board the vehicle.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
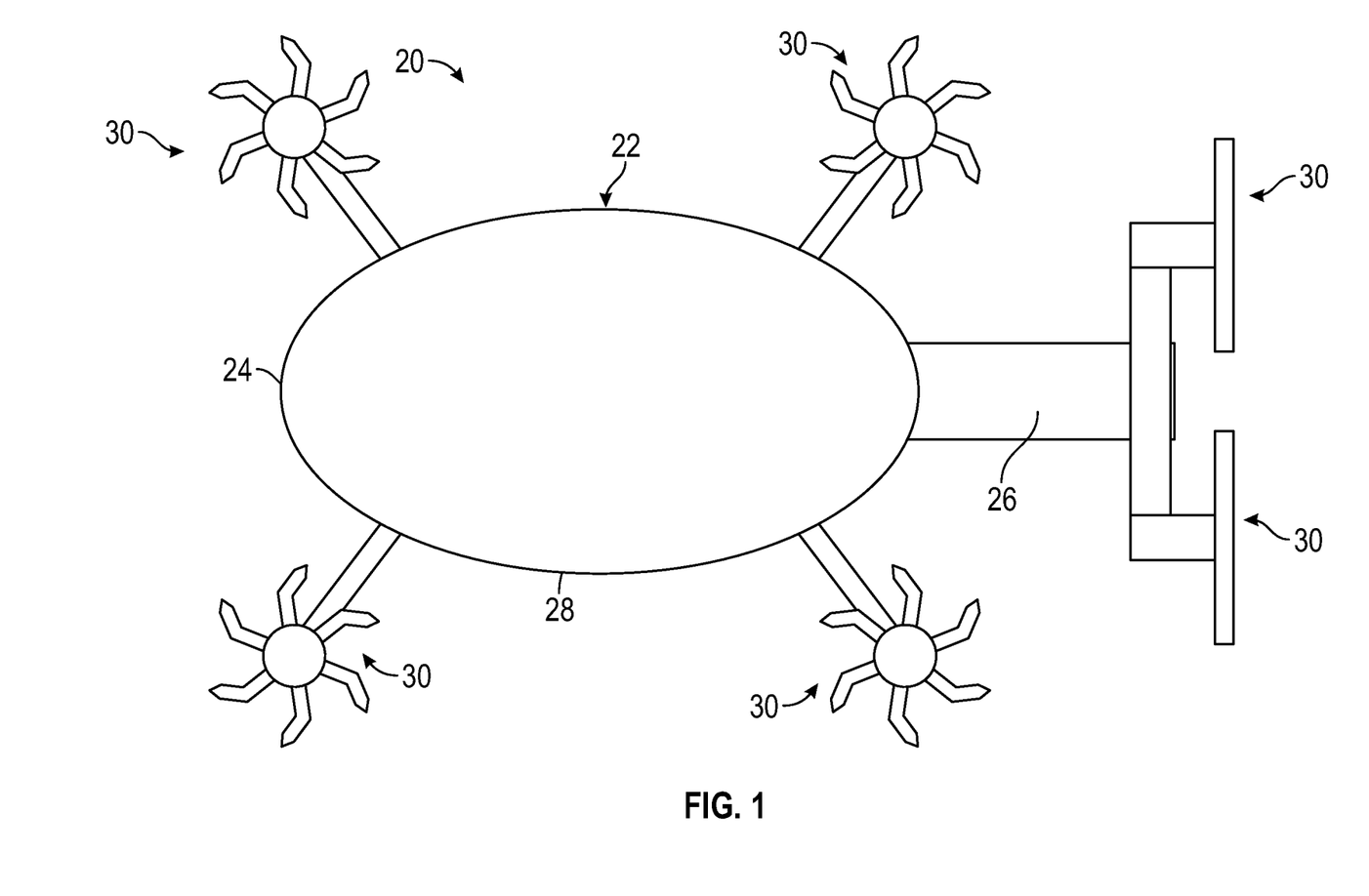
FIG. 1 is a plan view of an example of a vehicle.

With reference now to FIG. 1, an example of a vehicle 20, such as a vertical take-off and landing rotary wing aircraft for example, is illustrated. As shown, the vehicle 20 includes a body or fuselage 22 having a generally aerodynamic shape and including a nose section 24, a trailing end or tail section 26 opposite from the nose section 24, and an airframe 28. The vehicle additionally includes at least one propulsion system 30 mounted to the fuselage 22. In the illustrated, non-limiting embodiment, the vehicle 20 has a plurality of rotor propulsion systems 30 mounted at each opposing side of the fuselage; however, it should be understood that a vehicle 20 having any number of rotor propulsion systems 30 including a single rotor propulsion system, and/or a single rotor propulsion system mounted at each side of the fuselage is within the scope of the disclosure.

Figure 2:
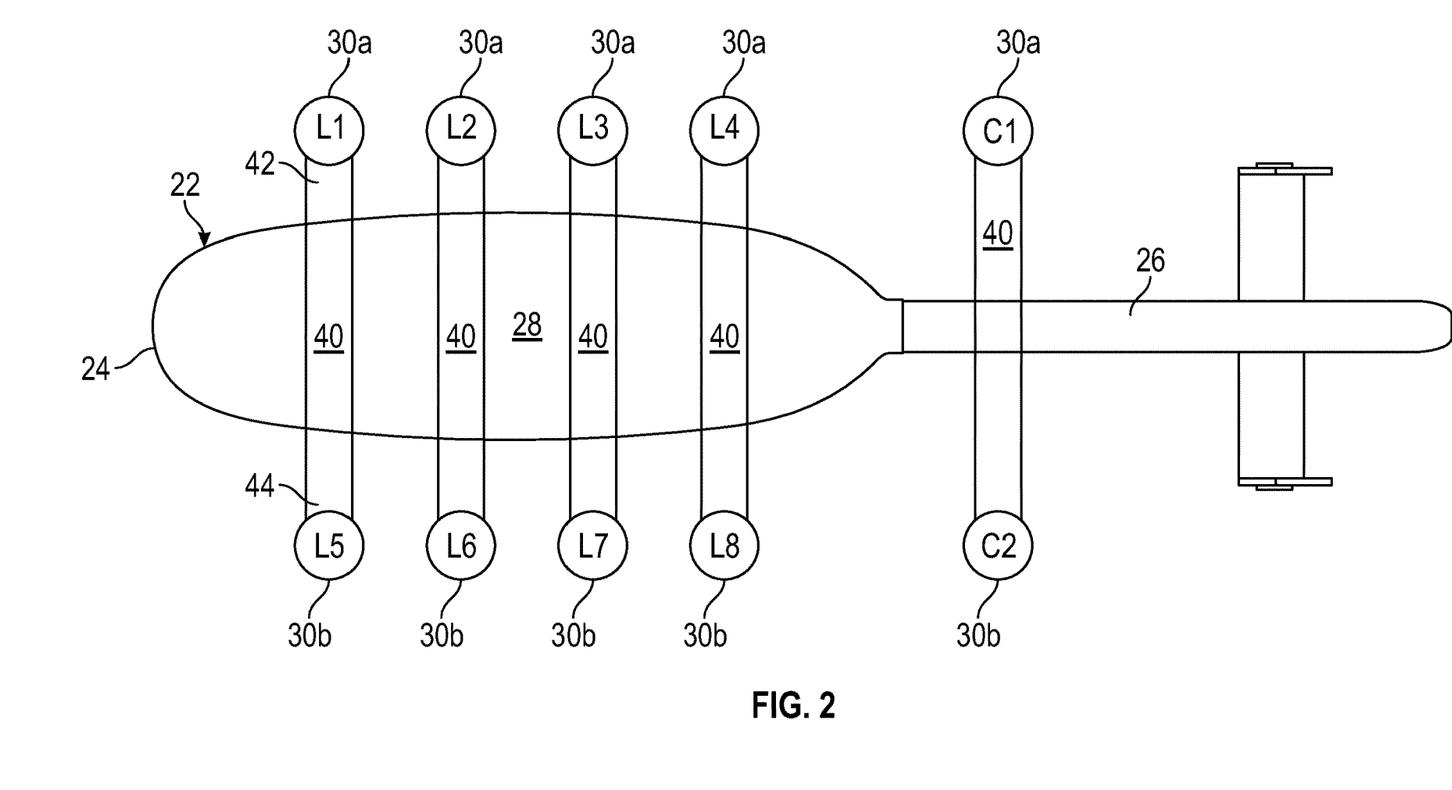
FIG. 2 is a schematic diagram of the rotor propulsion systems of the vehicle of FIG. 1 according to an embodiment.

In an embodiment, best shown in FIG. 2, the rotor propulsion systems 30 are mounted to the fuselage 22 in groups, for example pairs, with each pair including a first rotor propulsion 30a system arranged adjacent to a first side of the fuselage 22 and a second rotor propulsion system 30b arranged adjacent to a second, opposite side of the fuselage 22. In such embodiments, the first and second rotor propulsion system 30a, 30b within a pair may be substantially identical such that the rotor propulsion systems 30a, 30b are capable of balancing forces therebetween. In embodiments where the vehicle 20 includes multiple groups or pairs of rotor propulsion systems, each of the rotor propulsion systems mounted at the same side of the aircraft, such as systems identified by 30a or 30b for example, may have similar, or alternatively, may have different configurations.

With continued reference to FIG. 1 and further reference to FIG. 2, in an embodiment, the vehicle 20 may include at least one rotor propulsion system operable during a first flight mode, indicated at L1-L8, such as during take-off or landing for example, and at least one rotor propulsion system, identified at C1-C2, operable during a second mode of operation, such as during cruise for example. Accordingly, the size and/or configuration of at least a portion of a rotor propulsion system 30a, 30b associated with the first flight mode may be different than the size and/or configuration of at least a portion of a rotor propulsion system 30a, 30b associated with the second flight mode.

Each rotor propulsion system 30 is mounted to a portion of the fuselage 22, such as to the airframe 28 for example, via a structural component or strut 40. In embodiments where the rotor propulsion systems 30a, 30b are arranged in pairs, a pair of rotor propulsion systems 30a, 30b may be mounted to the fuselage 22 via a single strut 40. For example, the first rotor propulsion system 30a may be mounted at a first end 42 of the strut 40 and the second rotor propulsion system 30b may be mounted at the second end 44 of the strut 40. However, embodiments where each rotor propulsion system 30 is mounted to a separate strut 40 are also contemplated herein.

Figure 3:
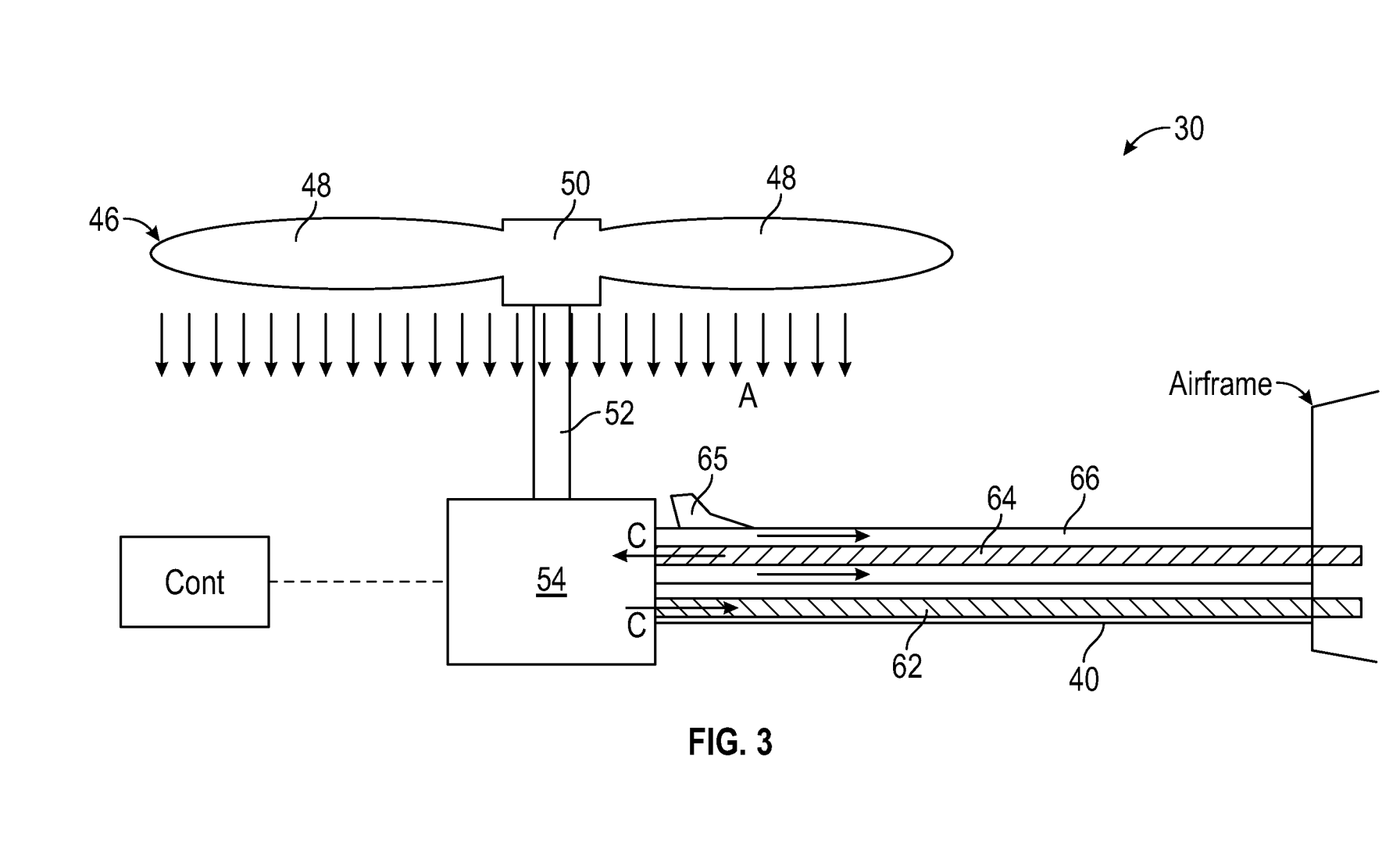
FIG. 3 is a schematic diagram of a cooling system of a rotor propulsion system according to an embodiment.

In an embodiment, best shown in FIG. 3, each rotor propulsion system 30 includes a rotor 46 having a plurality of rotor blades 48 mounted to a rotor hub 50. A rotor shaft 52 extending from the rotor hub 50 may be driven about an axis of rotation X via an electric component, such as an electric motor, illustrated schematically at 54. Each rotor 46 may be driven by a separate motor 54, or alternatively, a plurality of rotors 46 may be driven by a single motor 54. The one or more electric motors 54 may be controlled by a controller CONT in response to a flight control system (not shown).

Although the vehicle 20 is described herein as having rotor propulsion systems 30 that include an electric motor 54, it should be understood that embodiments where the vehicle 20 is a hybrid vehicle and therefore additionally includes a gas turbine engine operably coupled to the one or more rotors 46 are also within the scope of the disclosure. Further, it should be appreciated that other configurations of an aircraft including fixed-wing aircraft, tiltrotor aircraft, rotary-wing aircraft, and tail-sitting VTOL aircraft, and other vehicles having an electrically powered rotor propulsion system may also benefit from embodiments disclosed.

During operation, one or more electric components of the vehicle 20, such as the motors 54 used to drive the rotor propulsion systems 30 for example, typically generate heat. A cooling system 60 including a cooling fluid C is therefore used to remove heat from the electrical components to maintain the electrical components at a suitable temperature. With continued reference to FIG. 3, in an embodiment, the cooling system 60 associated with a motor 54 of a rotor propulsion system is at least partially embedded within the interior of the strut 40 supporting the motor 54 and the corresponding rotor 46 of the rotor propulsion system 30. For example, at least one conduit fluidly connected to the motor 54 is arranged within the strut 40. The at least one conduit may include one or more conduits 62 configured to move the heated cooling fluid away from the motor 54 and/or one or more conduits 64 for delivering a cool temperature cooling fluid to the motor 54.

Heat is configured to be removed from the cooling fluid while the cooling fluid C is arranged within the interior of the strut 40. In an embodiment, the cooling fluid within the interior of the strut 40 is cooled via a heat exchange relationship with a secondary fluid. The secondary fluid may be another fluid provided from a source located onboard the vehicle 20, such as fuel for example, or may be provided from a source external to the vehicle 20. An airflow, such as the fresh or outside air A moved by the rotor 46 of the rotor propulsion system 30 and/or generated by movement of the vehicle 20 may be used as the secondary fluid to cool the cooling fluid. In an embodiment, the secondary fluid is configured to flow about an exterior of the strut 40 to cool the cooling fluid C. Alternatively, or in addition, the secondary fluid may be configured to flow through the interior of the strut 40. In such embodiments, as best shown in FIG. 3, one or more scoops 65 formed at an exterior of the strut 40 may provide an inlet to the interior of the strut 40.

In an embodiment, a heat exchanger 66 is arranged within the interior of the strut 40 along the fluid flow path of the cooling fluid C. As shown in FIG. 3, the heat exchanger 66 may be arranged directly upstream from the motor relative to flow of the cooling fluid C. In such embodiments, as a flow of heated cooling fluid moves through the conduit 64 towards the motor 54, heat is transferred to the secondary fluid. Accordingly, by the time that the cooling fluid C reaches the motor 54, the cooling fluid C has been cooled to a suitable temperature to remove heat from the motor 54. In other embodiments, best shown in FIG. 5, the heat exchanger 66 may be arranged downstream from the electric motor 54 relative to the flow of the cooling fluid C such that the cooling fluid C is cooled generally directly downstream from the outlet of the motor 54.

Figure 4A:
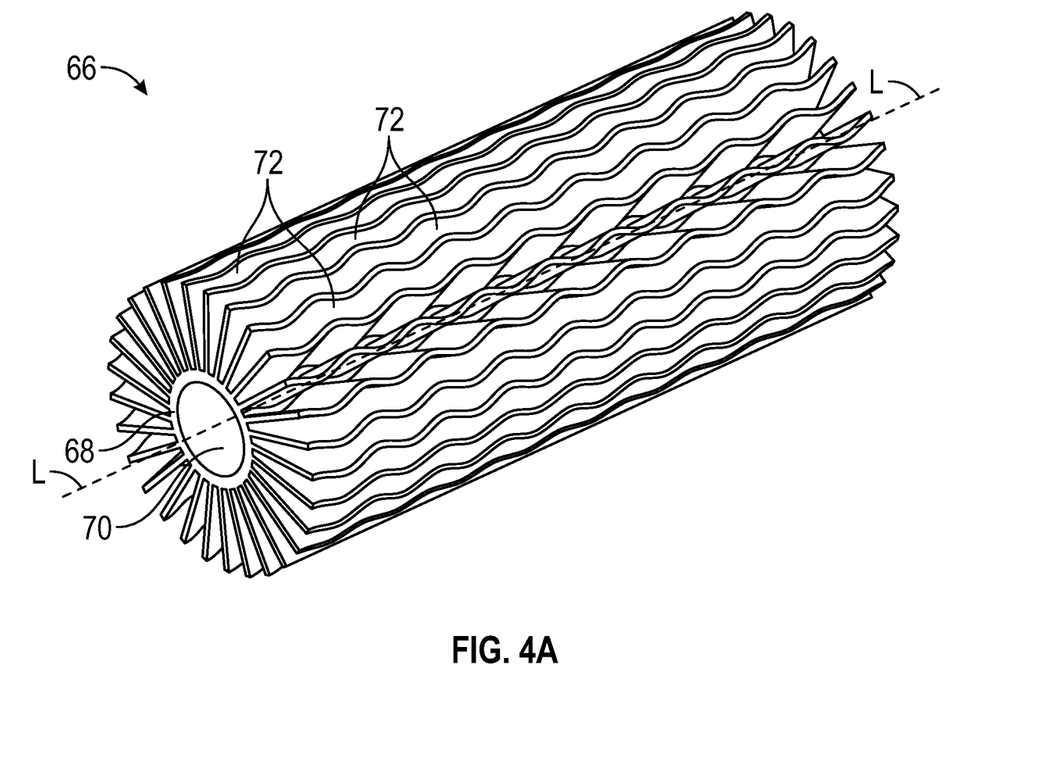
FIG. 4A is a perspective view of a heat exchanger of the cooling system according to an embodiment.
Figure 4B:
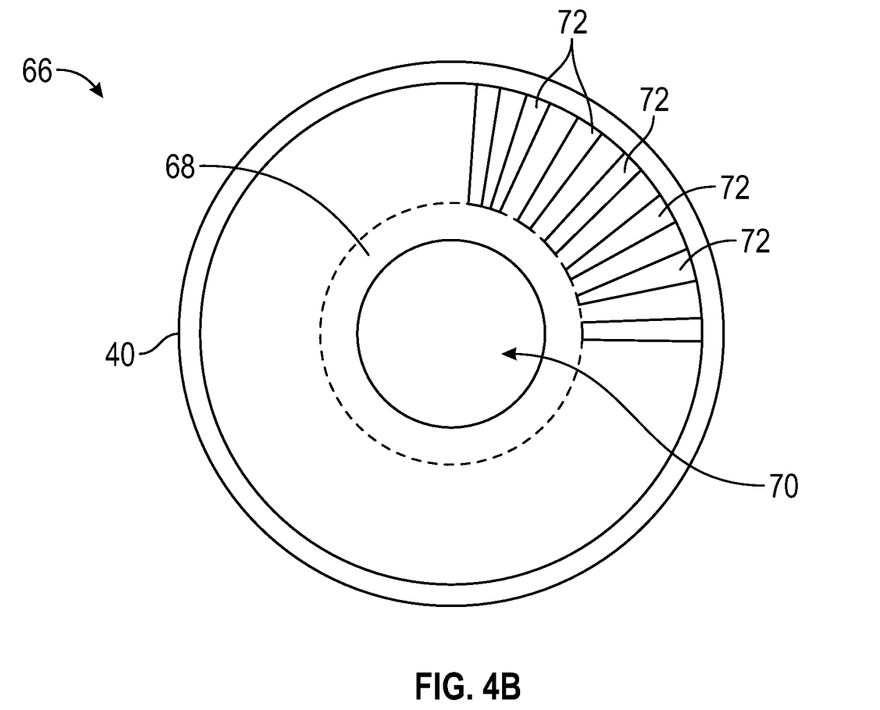
FIG. 4B is an end view of the heat exchanger of FIG. 4A according to an embodiment.

An example of a heat exchanger 66 posititonable within the interior of a strut 40 is illustrated in FIGS. 4A and 4B. In the illustrated, non-limiting embodiment, the heat exchanger 66 is a tube-fin heat exchanger having a generally cylindrical base 68 configured to receive the heated cooling fluid C. The conduit containing the heated cooling fluid C may be mounted concentrically within the interior 70 of the base 68, or in an embodiment, the hollow interior of the base 68 may define a portion of the conduit. As shown, a plurality of fins 72 extends generally radially outwardly from the base 68. The fins 72 may extend over the entire length (between a first end and a second opposite end) of the base, or may extend over only a portion of the length thereof. Each of the plurality of fins 72 is spaced apart from another of the plurality of fins 72.

In one embodiment, the heat exchanger 66 is substantially axisymmetric about its longitudinal axis L. The plurality of fins 72 may, but need not be, substantially identical. In addition, the size and/or shape of each of the plurality of fins 72 may be generally constant over its length. Alternatively, the size and/or shape of at least one of the plurality of fins 72 may vary about the periphery of the base 68 or over the length of the base 68. In the illustrated, non-limiting embodiment, one or more of the plurality of fins 72 has a constant thickness, but a non-linear contour. For example, as shown, all or at least a portion of the fins 72 has one or more waves extending along the longitudinal axis L of the heat exchanger 66. It should be understood that the heat exchanger illustrated and described herein is intended as an example only and that any suitable type of heat exchanger, such as a double pipe, shell and tube, plate, plate and shell, adiabatic shell, plate fin, pillow plate, and fluid heat exchanger is within the scope of the disclosure.

Figure 5:
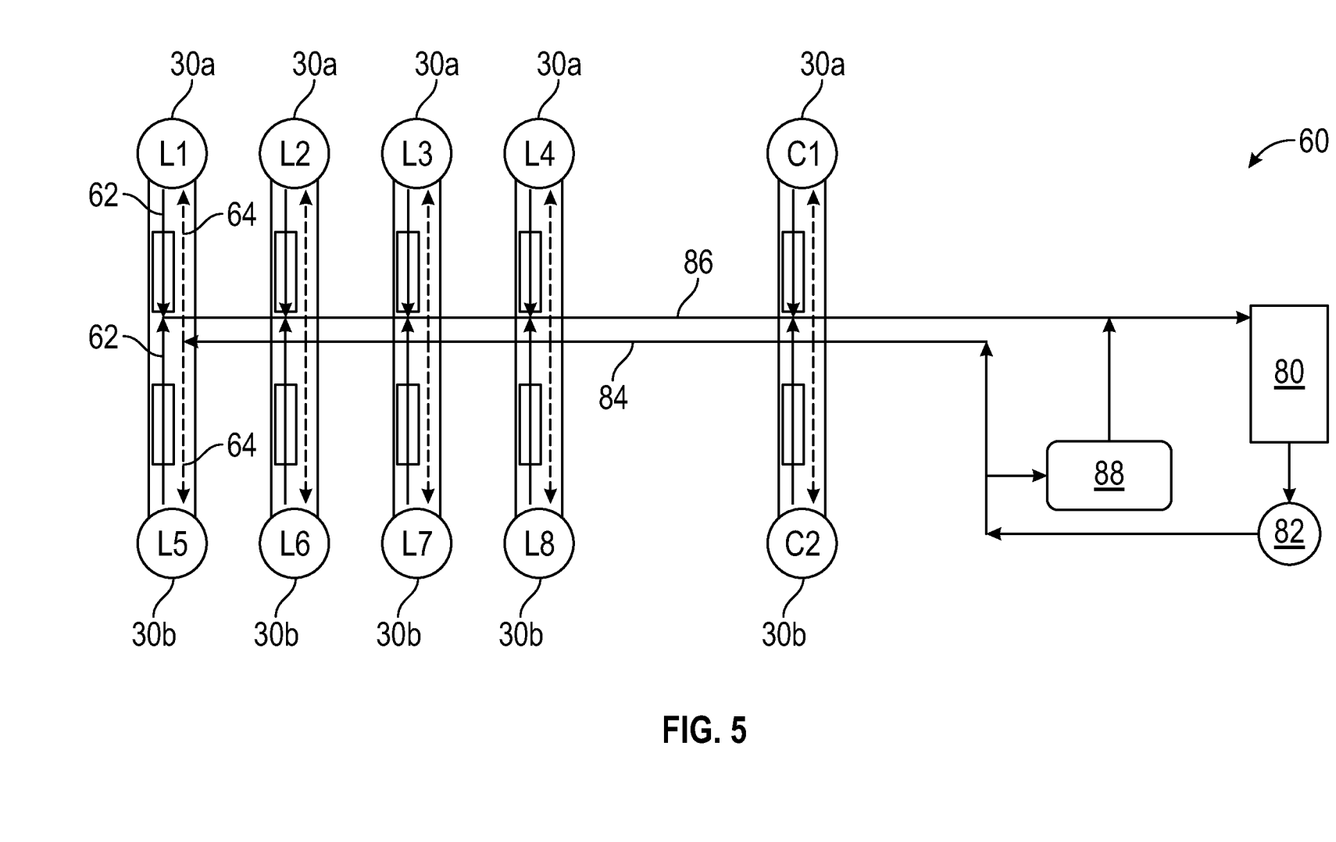
FIG. 5 is a schematic diagram of a cooling system of the rotor propulsion systems of a vehicle according to an embodiment.

The vehicle 20 may have a separate cooling system 60 associated with each of the plurality of rotor propulsion systems 30 and/or electrical components. However, in an embodiment, a single cooling system 60 may be operably coupled to a plurality of rotor propulsion systems 30. With reference to FIG. 5, in the illustrated, non-limiting embodiment, the cooling system 60 is a closed loop system configured to cool each of the rotor propulsion systems 30. As shown, the cooling system 60 includes a tank 80 containing a volume of cooling fluid C. A pump 82 is configured to deliver cooling fluid from the tank 80 to one or more delivery conduits 64. Each of the plurality of conduits 64 is fluidly connected to a main conduit 84 such that the cooling fluid C may be delivered to the conduits 64 in parallel. A valve, not shown, may be arranged within the conduit 64 or at the interface between the main conduit 84 and a respective conduit 64. In such embodiments, the valve may be operable to selectively control a flow of cooling fluid C to the motor 54 of the rotor propulsion system 30 associated with the conduit 64, such as based on an operational state of the motor 54 for example. The heated flow of cooling fluid C output from the motor 54 is then cooled within the strut 40 as it passes through the conduit 62 to a second main conduit 86 configured to return the cooling fluid C to the tank 80.

Other electrical components of the vehicle 20, such as a generator for example, may also be cooled by the cooling system 60. In the illustrated, non-limiting embodiment, a first portion of the cooling fluid C output from the tank 80 may be directed towards a generator 88 while the second portion is provided to the main conduit 84 for delivery to the rotor propulsion systems 30. The cooling fluid output from the generator 88 may then be provided directly to the tank 80, or alternatively, may be cooled, such as via a heat exchanger for example, before being returned to the tank 80. In addition, cooling fluid C from the pump 82 can also be directed to one or more motor controllers to cool them (not shown).

By integrating the cooling of the cooling fluid C into the cooling system 60, the need for separate cooling components, such as nacelle fans for example can be eliminated. Accordingly, a vehicle having a cooling system 60 as described herein may have a reduced sizing envelope, weight, and energy consumption.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A vehicle comprising:
   a body;
   a plurality of propulsion systems, each of the plurality of propulsion systems including an electric component;
   at least one strut extending between the body and each of the plurality of propulsion systems; and
   a cooling system operably coupled to the electric component of each of the plurality of propulsion systems, wherein a portion of the cooling system is arranged within the strut, the cooling system including:
      a tank containing a volume of a cooling fluid, wherein the cooling fluid is operable to remove heat from each of the plurality of propulsion systems;
      a plurality of delivery conduits, each delivery conduit of the plurality of delivery conduits being arranged within the at least one strut, the plurality of delivery conduits being upstream from and fluidly coupled to an inlet of one of the plurality of propulsion systems;
      a main conduit extending between and fluidly connecting an outlet of the tank and each of the plurality of delivery conduits, the plurality of delivery conduits being fluidly connected to the main conduit in parallel;

a heat exchanger arranged within an interior of the at least one strut at a location directly upstream from the at least one propulsion system;

a secondary fluid in thermal communication with the cooling fluid at the heat exchanger, wherein heat is removed from the cooling fluid by the secondary fluid; and an air scoop for delivering the secondary fluid to the heat exchanger arranged within the interior of the at least one strut.

2. The vehicle of claim 1, wherein the secondary fluid is provided from a source external to the vehicle.

3. The vehicle of claim 2, wherein the secondary fluid is air driven by at least one of the plurality of propulsion systems.

4. The vehicle of claim 2, wherein the secondary fluid is an airflow generated by movement of the vehicle.

5. The vehicle of claim 1, wherein the secondary fluid is provided from a source located onboard the vehicle.

6. The vehicle of claim 1, wherein the heat exchanger is a tube-fin heat exchanger having a base and a plurality of fins extending outwardly from the base.

7. The vehicle of claim 6, wherein the cooling fluid is configured to move through the base and the secondary fluid is configured to pass between the plurality of fins.

8. The vehicle of claim 1, wherein the cooling fluid is configured to flow through a delivery conduit of the plurality of delivery conduits away from a corresponding electric component.

9. The vehicle of claim 1, wherein the cooling fluid is configured to flow through a delivery conduit of the plurality of delivery conduits to a corresponding electric component.

10. The vehicle of claim 1, wherein the plurality of propulsion systems includes a first propulsion system and a second propulsion system, the first propulsion system being arranged at a first end of the at least one strut and the second propulsion system being arranged at a second end of the at least one strut.

11. The vehicle of claim 1, wherein a propulsion system of the plurality of propulsion systems is arranged at a first end of the at least one strut and the body is arranged at a second end of the at least one strut.

12. A method of cooling a plurality of electric components of a vehicle comprising:

providing a plurality of propulsion systems each including one of the plurality of electric components, the plurality of propulsion systems being mounted to the vehicle via at least one strut;

providing a cooling system including:

a tank containing a volume of a cooling fluid;

a plurality of delivery conduits, each delivery conduit of the plurality of conduits being arranged within the at least one strut, the plurality of delivery conduits being upstream from and fluidly coupled to an inlet of one of the plurality of propulsion systems; and a main conduit extending between and fluidly connecting an outlet of the tank and each of the plurality of delivery conduits, the plurality of delivery conduits being fluidly connected to the main conduit in parallel;

circulating the cooling fluid to remove heat from the electric component; and providing a secondary fluid to an interior of the strut via an air scoop; and arranging the cooling fluid in a heat exchange relationship with the secondary fluid at a heat exchanger, the heat exchanger being located within an interior of the strut upstream from the electric component relative to a flow of the cooling fluid.

13. The method of claim 12, wherein arranging the cooling fluid in the heat exchange relationship with the secondary fluid further comprises providing a flow of the secondary fluid from a source located external to the vehicle.

14. The method of claim 13, wherein the secondary fluid is air driven by the propulsion system.

15. The method of claim 13, wherein the secondary fluid is an airflow generated by movement of the vehicle.

16. The method of claim 12, wherein arranging the cooling fluid in the heat exchange relationship with the secondary fluid further comprises providing a flow of the secondary fluid from on board the vehicle.

17. A vehicle comprising:

a body;

at least one propulsion system including an electric component;

a strut extending between the body and the at least one propulsion system; and a cooling system operably coupled to the electric component of the at least one propulsion system, wherein a portion of the cooling system is arranged within the strut, the cooling system including:

a cooling fluid operable to remove heat from the at least one propulsion system;

a heat exchanger arranged within the interior of the strut at a location directly upstream from the at least one propulsion system; and a secondary fluid receivable within the interior of the strut, the secondary fluid being arranged in thermal communication with the cooling fluid at the heat exchanger, wherein heat is removed from the cooling fluid by the secondary fluid; and an air scoop for delivering the secondary fluid to the heat exchanger arranged within the interior of the at least one strut.

* * * * *